United States Patent
Onnela et al.

(10) Patent No.: US 6,662,630 B2
(45) Date of Patent: Dec. 16, 2003

(54) METHOD FOR MEASURING SLIDE BEARING PRESSURE IN A DEFLECTION-COMPENSATED ROLL WITH A FIXED SHELL

(75) Inventors: Jori Onnela, Jyväskylä (FI); Ari Lehto, Leppävesi (FI)

(73) Assignee: Metso Paper, Inc., Helsinki (FI)

( * ) Notice: Subject to any disclaimer, the term of this patent is extended or adjusted under 35 U.S.C. 154(b) by 27 days.

(21) Appl. No.: 09/832,556

(22) Filed: Apr. 11, 2001

(65) Prior Publication Data
US 2002/0011116 A1 Jan. 31, 2002

(30) Foreign Application Priority Data

Apr. 12, 2000 (FI) .............................................. 20000873

(51) Int. Cl.[7] .............................................. G01B 13/04
(52) U.S. Cl. ........................... 73/37.7; 73/37.7; 73/841; 492/7; 492/10; 492/20
(58) Field of Search ................................ 492/7, 10, 20; 73/37.7, 841

(56) References Cited

U.S. PATENT DOCUMENTS

| 4,271,575 | A | | 6/1981 | Lehmann | |
|---|---|---|---|---|---|
| 4,435,971 | A | * | 3/1984 | Schuwerk | 72/241.6 |
| 4,625,637 | A | | 12/1986 | Pav et al. | |
| 5,303,440 | A | * | 4/1994 | Zimmer | 68/205 R |
| 5,509,883 | A | * | 4/1996 | Niskanen et al. | 492/20 |
| 5,685,813 | A | * | 11/1997 | Kivioja et al. | 492/10 |
| 5,743,839 | A | * | 4/1998 | Niskanen | 492/20 |
| 5,823,927 | A | * | 10/1998 | Van Haag | 492/20 |
| 5,860,903 | A | * | 1/1999 | Niskanen | 492/20 |

FOREIGN PATENT DOCUMENTS

| EP | 0 332 594 B1 | 12/1993 |
|---|---|---|
| FI | 76870 | 8/1988 |
| FI | 79177 | 7/1989 |

OTHER PUBLICATIONS

A copy and a translation of the of the official action in the Finnish Priority Application No. 20000873.

* cited by examiner

Primary Examiner—Hezron Williams
Assistant Examiner—André K. Jackson
(74) Attorney, Agent, or Firm—Stiennon & Stiennon

(57) ABSTRACT

A deflection compensated roll has a stationary support structure and a shell rotatably arranged around it by means of slide bearings. The shell is additionally supported on the support structure with hydraulic loading devices by which the axial profile of the shell can be controlled. In the procedure, at least the pressure acting in the main bearing elements of the slide bearings effective in oppsite directions in the nip plane is measured by conducting pressure data from a pressure space between a control valve associated with the main bearing elements and each main bearing element by means of measurement ducts outside the roll where the pressure data is passed to a pressure sensor.

7 Claims, 2 Drawing Sheets

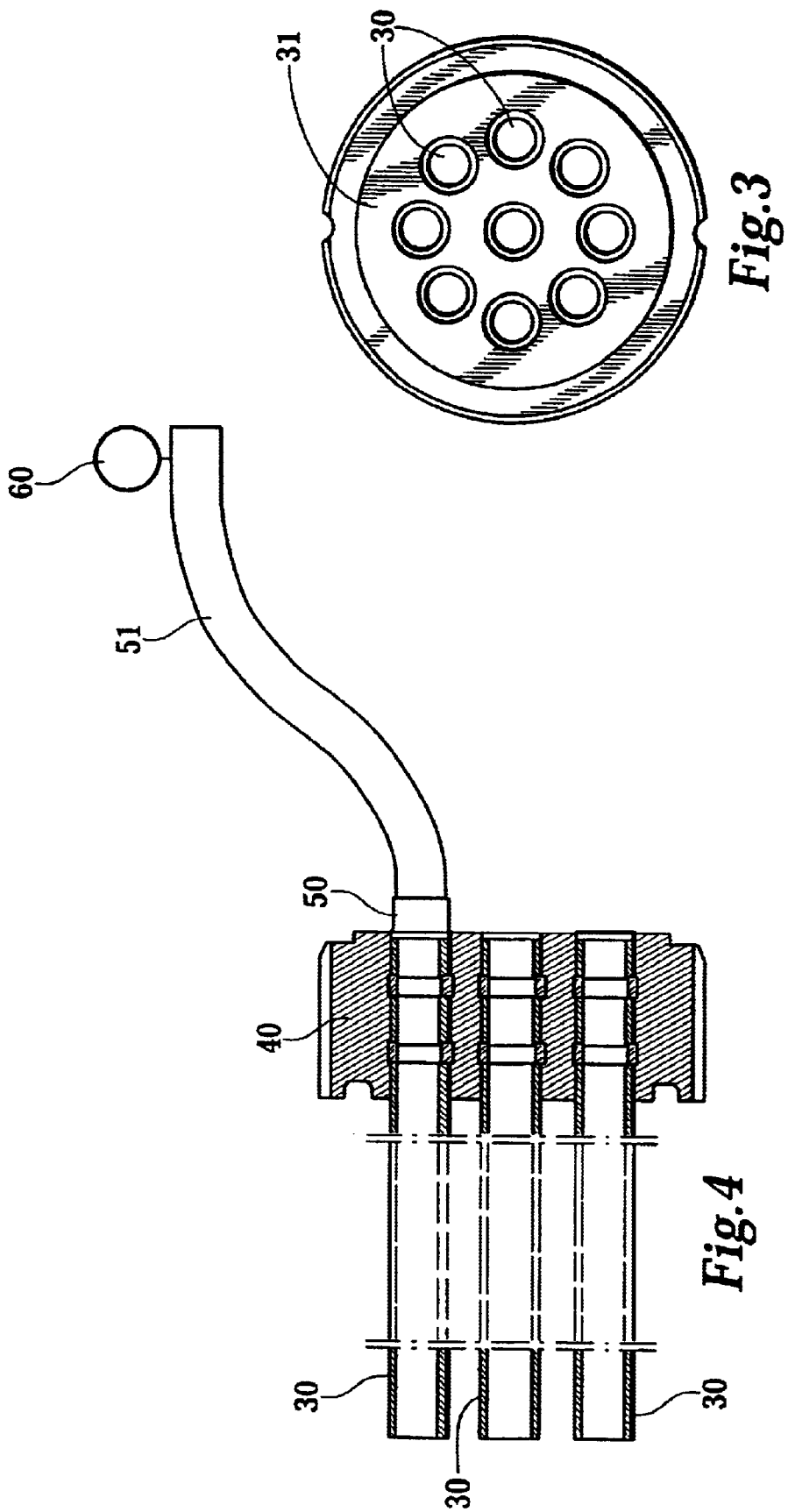

METHOD FOR MEASURING SLIDE BEARING PRESSURE IN A DEFLECTION-COMPENSATED ROLL WITH A FIXED SHELL

CROSS REFERENCES TO RELATED APPLICATIONS

This application claims priority on Finnish Application No. 20000873, Filed Apr. 12, 2000, the disclosure of which is incorporated by reference herein.

STATEMENT AS TO RIGHTS TO INVENTIONS MADE UNDER FEDERALLY SPONSORED RESEARCH AND DEVELOPMENT

Not applicable

BACKGROUND OF THE INVENTION

The invention relates to a method for measuring slide bearing pressure in a deflection-compensated roll with a fixed shell.

In paper and board machines, deflection-compensated rolls (TK) are in general used which are formed from a stationary support structure and a tubular shell arranged to rotate therearound, said shell being bearably carried on the ends to a support structure by end bearings. Between the shell and the support structure, hydraulically loaded loading elements are moreover provided, being supported to the support structure and acting on the inner face of the shell in a radial direction, wherewith the profile of the shell can be adjusted in the axial direction. A row of loading elements to be used for adjusting the profile of the shell is positioned in the nip plane and with said loading elements, the bending of the shell of the TK roll and the backing roll is compensated so that the force acting on the web in the nip plane is equal across the entire axial direction of the shell. To intensify the profiling, so-called loading elements forming a counterzone can in addition be used on the opposite side of the support structure in relation to the nip in the TK roll. The loading elements of the counterzone can be positioned in one row, whereby a row is in the nip plane, or in two rows, whereby the rows are located symmetrically on both sides of the nip plane. By means of the loading members of the counterzone the shell can also be loaded with a desired force, whereby the configuration of the shell is profiled to be as desired.

The TK rolls can be divided into rolls with a mobile shell and rolls with a fixed shell. In the present context the TK rolls with a mobile shell refer to rolls in which the end bearings can be moved in radial direction, that is, normally in the nip plane relative to the support structure, whereby also the shell moves together with the end bearings in the nip plane. Transferring of end bearings is normally carried out so that pressure spaces acting in the nip plane are arranged between the end bearings and the support structure. By conducting a pressure medium into said pressure spaces, the end bearings can be transferred in the nip plane. By means of said transfer of the end bearings relative to the support structure, the opening and closing of the nip can be carried out, as well as partial loading and relief of the TK roll against the backing roll.

The TK rolls with a fixed shell refer to rolls in which the shell is not, at least to a significant extent, moved in a radial direction relative to the support structure. On fixed-shell TK rolls, the opening and closing of the nip and the loading and relief of the TK roll against the backing roll are performed with hydraulically operating loading arms supported to the support structure of the TK roll. In fixed-shell rolls, mechanical rolling bearings or hydraulic slide bearings can be used as end bearings. In a fixed-shell roll provided with rolling bearings, the end bearings are locked in radial direction to the support structure and the shell is locked in radial direction to the end bearings. In a fixed-shell roll provided with hydraulic slide bearings, the shell is able to move slightly in a radial direction owing to the nature of the bearing.

In rolls with a mobile shell and a fixed shell, rolling bearings or slide bearings can be used for end bearings between the shell and the support structure.

The present invention can be embodied in fixed-shell TK rolls provided with hydraulic slide bearings, in which the slide bearing operation is carried out essentially without strokes.

In FI patent No. 76870 (Kleinewefers GmbH), a TK roll with a fixed shell is disclosed, in which the shell is bearably carried on the ends of a support structure with rolling bearings. Indicators are arranged in the area of the rolling bearings, the measurement values of which indicate loading of the end bearings in the nip plane. By means of a control device, pressures to be supplied to the loading shoes of the loading zone and the loading shoes of the backing zone are controlled, being dependent on parameters measured in operation and/or determined in advance, and depending on the measurements of the indicators so that the loading of the end bearings is approximately zero in the nip plane.

Instead of measuring the direct bearing force with the aid of indicators arranged in the area of the rolling bearings, the forces acting on the rolling bearings can be defined also indirectly. This can be carried out by measuring the forces acting on the support spots of the support structure of the backing roll, the forces acting on the support spots of the support structure of the TK roll and the forces caused by the loading devices on the shell of the TK roll. On the basis of said forces, the forces acting on the rolling bearings of the TK roll are calculated. In the loading spots in which the forces are generated with the hydraulic loading devices, the pressures of the hydraulic loading devices are measured and on the basis thereof and of the surface areas of the pressure chambers of the pistons of the hydraulic loading devices, the forces acting on the hydraulic loading devices are calculated. In the calculations, the masses acting in the support spots and the friction factors acting in different locations are moreover paid attention to. The bearing force calculated with this kind of method is naturally inaccurate.

FI patent No. 79177 discloses a deflection-compensated roll with a mobile shell provided with rolling bearings. Therein, the shell is bearably carried on both ends to the support structure with rolling bearings arranged on top of the annular parts. Between the annular parts and the support structure, hydraulic loading members are disposed. With the loading members, the shell can be transferred relative to the support structure for opening and closing the nip. By the loading members, the shell can also be loaded against the backing roll.

In the mobile-shell TK rolls, in which a transfer of the end bearings based on the rolling bearings is carried out with a hydraulics medium brought into the pressure spaces between the bearings and the support structure, the pressure of the pressure medium conducted into said pressure spaces can be measured. A certain nip profile requires the use of a bearing force of a given magnitude, whereby the pressure equivalent thereto is tried to be kept under the bearing. The bearing force is determined on the basis of the surface areas of the pressure spaces influencing the bearings.

SUMMARY OF THE INVENTION

With the method according to the invention, sufficiently precise information is achieved each time of the pressures acting on the slide bearings of the fixed-shell TK roll being carried with slide bearings, on the basis whereof the forces acting on the slide bearings can be calculated.

The slide bearing of a TK roll comprises main bearing elements acting in opposite directions in the nip plane and side bearing elements acting in a transverse direction relative to the nip plane. Immediately below the first main bearing element focussed on the nip, that is, the guiding main bearing element, a first control valve is positioned, which on the basis of the loading acting on the main bearing elements distributes the pressure medium between the main bearing elements. To that main bearing element on which a greater load is at each moment acting, a greater flow and pressure is fed and respectively, to an opposite main bearing element, a lesser flow and pressure is fed. The control of the side bearing elements is carried out in an equivalent manner with the aid of a second control valve. The control valves should be located right below the guiding bearing element so that their response to an external loading can be made as brief as possible.

The invention is described below in detail, referring to the example embodiments of the invention presented in the figures of the accompanying drawings, whereto the invention is not intended to be solely restricted.

Further objects, features and advantages of the invention will be apparent from the following detailed description when taken in conjunction with the accompanying drawings.

BRIEF DESCRIPTION OF THE DRAWINGS

FIG. 3 presents a schematic cross-section of an arrangement of measurement tubes used in measuring pressures of the slide bearings.

FIG. 4 presents a schematic longitudinal section of an arrangement of measurement tubes used in measuring pressures of the slide bearings.

DESCRIPTION OF THE PREFERRED EMBODIMENTS

Figure 1:
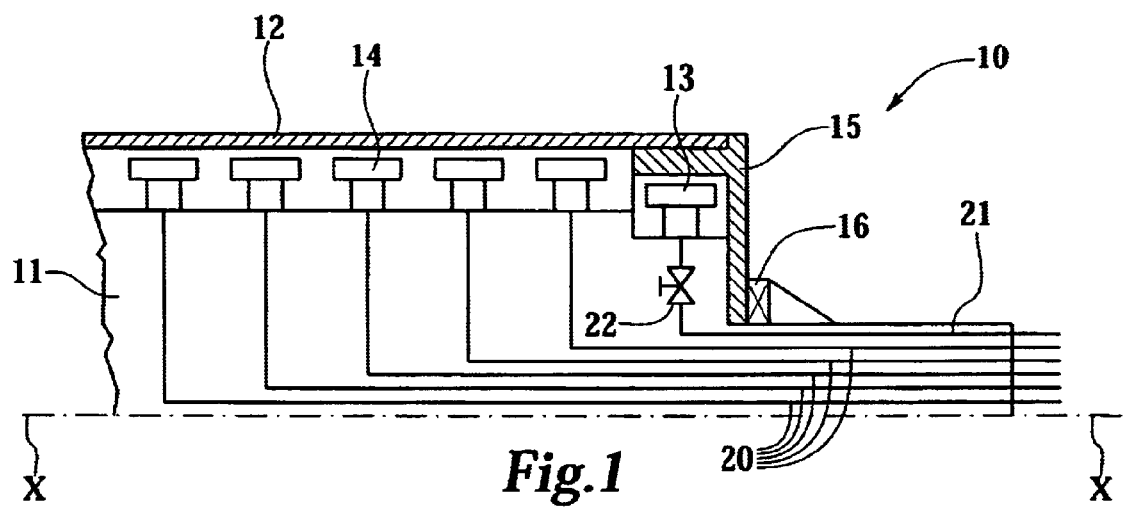
FIG. 1 presents a schematic longitudinal section of one end of a fixed-shell, deflection-compensated roll provided with slide bearings, shown above the central axis.

FIG. 1 presents a schematic longitudinal section of one end of a fixed-shell, deflection-compensated roll 10 provided with slide bearings 13 shown above the central axis X—X. The roll 10 comprises a stationary support structure 11 and a shell 12 rotating therearound. The shell 12 is supported on the ends to the support structure 11 by means of hydraulic slide bearings 13. Between the hydraulic slide bearings 13, the shell 12 is moreover supported in the nip plane to the support structure 11 by means of hydraulic loading devices 14. The end of the roll is closed with an end piece 15 supported in axial direction to the support structure 11 with a support member 16. The support in axial direction may also be implemented in the other end of the roll only, whereby support members 16 are provided in axial direction on both sides of the end piece 15 of the roll. An individual supply duct 20 for pressure medium leads here to each loading device 14, whereby each loading device 14 can be adjusted individually. The loading devices 14 may also be divided into groups so that one pressure medium supply duct 20 is inside the roll divided for a number of loading devices 14 so that each group forms one adjustment zone. In an extreme case, a group may extend onto the length of the entire nip, whereby the roll is provided with one zone and one supply duct 20 only. The control valves of the pressure medium ducts 20 leading to the loading devices 14 can be located in a separate control valve unit outside the roll (not shown in the figures) or they may be attached to the end part of the roll axle. On the other hand, the control valve 22 positioned in the pressure medium supply duct 21 leading to the slide bearings 13 may be located in the immediate adjacency to the slide bearings 13.

Figure 2:
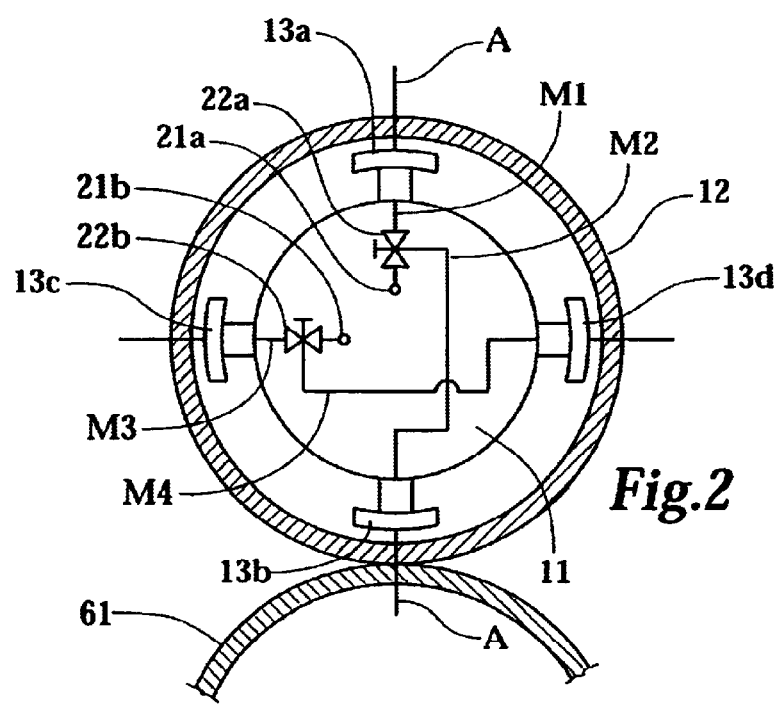
FIG. 2 presents a schematic cross-section of the end of the roll of FIG. 1 at the hydraulic slide bearing.

The hydraulic end bearing shown in FIG. 2 is comprised of end bearing elements 13a, 13b acting in opposite directions in the main loading direction, that is, in the direction of the nip plane A—A, and of side bearing elements 13c, 13d acting transversely in opposite directions to the nip plane A—A. With the main bearing elements 13a, 13b, the position of the shell 12 is adjusted relative to the nip plane A—A. With the side bearing elements 13c, 13d, the shell 12 is kept in right position transversely to the nip plane A—A. With the main bearing elements 13a, 13b and the side bearing elements 13c, 13d, also the oscillations are attenuated in the direction of the nip plane A—A and respectively, in the transverse direction. A first main bearing element 13a acting in the nip direction in the nip plane A—A is a so-called guiding bearing element and a second main bearing element 13b acting in the opposite direction is a so-called slave bearing element. Respectively, a first side bearing element 13c acting in transverse direction is a guiding bearing element and a second side bearing element 13d acting in opposite direction is a slave bearing element.

The supply of pressure medium to the bearing elements 13a, 13b, 13c, 13d is carried out so that in a first supply line 21a the pressure medium is supplied to a first control valve 22a located immediately under the first main bearing element 13a. Said first control valve 22a distributes in turn the pressure medium to the first main bearing element 13a and to the opposite second main bearing element 13b. In addition, the pressure medium is supplied in a second supply line 21b to a second control valve 22b immediately under the first side bearing element 13c, said valve distributing the pressure medium to the first side bearing element 13c and the opposite second side bearing element 13d. The control valves 22a, 22b distribute the pressure medium so that, irrespective of the external loading directed at the roll, a power balance is created between the bearing elements 13a, 13b; 13c, 13d being in opposite directions so that the shell 12 is kept in desired position relative to the bearing housing.

When loading is directed at the roll, e.g. in the direction of the nip at the first main bearing element 13a, the first control valve 22a increases the pressure and flow of the pressure medium supplied to the first main bearing element 13a, and, respectively, decreases the pressure and flow of the pressure medium to the second main bearing element 13b, whereby the shell 12 is kept stationary relative to the bearing housing.

In the arrangement shown in FIGS. 3 and 4 a measurement duct system 30 is shown, being conducted in a duct 31 formed in the support structure 11 into the roll at one end of the roll. Here, the measurement duct system comprises nine measurement ducts 30, each being inside the roll connected to the object to be measured. The slide bearing on each roll end contains four bearing pressures, of which measurement data is desired and in addition, one measurement duct is used e.g. for measuring the pressure prevailing inside the roll. Each of the measurement ducts is connected inside the roll to a pressure space between a bearing element 13a, 13b, 13c, 13d and a control valve 22a, 22b in association with the bearing element, whereby the pressure acting on the pressure chamber under the piston of the bearing element can at all times be measured. FIG. 2 shows a measurement point M1 in association with a first bearing element 13a, a measurement point M2 in association with a second main bearing element 13b, a measurement point M3 in association with a first side bearing element 13c and a measurement point M4 in association with a second side bearing element 13d.

The measurement duct system is taken out of the roll through a flange structure 40 attached to an end of the roll. The measurement ducts are sealedly attached to the flange structure 40 and the flange structure is attached sealedly to the support structure of the roll in order not to release pressure medium and any overpressure possibly prevailing inside the roll. Outside the roll, the measurement ducts 30 can be connected to measurement connectors 50 attached to an appropriate base. On the other end of the measurement connector 50, ducts 51 leading to measurement sensors 60 may in turn be connected [(not shown in the figures)].

The measurement duct system 30 can be comprised of individual measurement ducts arranged to pass in a space between the support structure 11 and the shell 12. The measurement ducts or some portions thereof may also be implemented as borings made in the support structure 11.

By means of the measurement arrangement of the invention, the pressure of each slide bearing element of the slide bearings on each end of the roll can be measured, on the basis whereof the force acting on said bearing element can be calculated. Bearing forces can be used for adjusting to a desired level the forces acting on the nip. In this manner, the rightfulness and controllability of the nip profile is brought to the same level as in slide-bearably carried rolls with a mobile shell.

The measured bearing forces may also be utilized in error diagnostics. When the forces acting on the slide bearings are moreover calculated in conventional fashion indirectly from other forces acting on the nip, a directly measured bearing force and an indirectly calculated bearing force are available. Hereby, calibration of parameters used in the calculation can be carried out so that the indirectly calculated bearing forces correspond to the directly measured bearing forces.

If the directly measured and the indirectly calculated calibrated bearing forces change thereafter as a function of time relative to each other, such conclusions may be drawn thereon that a valve or a sensor acting on the nip is faulty or requires calibration.

If, on the other hand, the thickness profile of a calendered web is deteriorating rapidly without any changes in the bearing force, the fault lies obviously in the thickness profile of the entering web, that is, before the calender.

On the basis of a measurement of the bearing force, also the condition of the rolls can be estimated. Variations in the bearing pressure synchronized with the speed of rotation of the TK roll are an obvious indication of a fault in the TK roll or in the banking roll 61, of non-roundedness, of resemblance to a banana, of a coating being damaged or of dirt accumulated e.g. on the surface of the roll. Pressure measurement and pressure oscillation can be used, in addition to other measurement data, e.g to prevent a more serious roll damage or e.g. disengaging of the coating. In a situation in which a measurement of bearing force indicates damage, the nip can be opened in order to prevent more serious damage.

In the embodiments of the figures, one main bearing element 13a, 13b is provided in the nip plane A—A in both directions, though each main bearing element 13a, 13b may, in fact, be comprised e.g. of two partial bearing elements. The partial bearing elements are in such instance located symmetrically on both sides of the nip level A—A.

The claims are presented below, within the scope of the inventive idea determined by which various details of the invention may vary and deviate from what is described above only in exemplary fashion.

We claim:

1. A method for measuring slide bearing pressure in a deflection-compensated roll with a fixed shell, the roll having a stationary support structure and a shell rotatably mounted to the stationary support structure on a hydraulic slide bearings including a first main bearing element operating in a first direction defined by a nip plane, and a second main bearing element operating in a direction opposite to the first direction, wherein a control valve communicates with the first main bearing element and the second main bearing element, and a first pressure space for hydraulic fluid is located between the first main bearing element and the control valve, and a second pressure space for hydraulic fluid is located between the second main bearing element and the control valve, and wherein the shell is additionally supported on the support structure with a plurality of hydraulic loading devices, by which the profile of the shell in an axial direction is controllable, the method comprising the steps of:

conducting hydraulic fluid from the first pressure space through a first measurement duct to a position outside the roll;

conducting hydraulic fluid from the second pressure space through a second measurement duct to a position outside the roll;

measuring the pressure of the hydraulic fluid at the first pressure space by a pressure sensor positioned in communication with the first measurement duct outside the roll; and measuring the pressure of the hydraulic fluid at the second pressure space by a pressure sensor positioned in communication with the second measurement duct outside the roll, wherein the slide bearings include a first side bearing element operating in a first transverse direction in a plane transverse to the nip plane and a second side bearing element operating in a direction opposite to the first transverse direction, and a second control valve is in communication with each of the first side bearing element and the second side bearing element, and wherein a third pressure space for hydraulic fluid is defined between the second control valve and the first side bearing element, and a fourth pressure space for hydraulic fluid is defined between the second control valve and the second side bearing element and wherein a third measurement duct extends from the third pressure space to a position outside the roll, and a fourth measurement duct extends from the fourth pressure space to a position outside the roll;

conducting hydraulic fluid through the third measurement duct from the third pressure space to a pressure sensor outside the roll; and conducting hydraulic fluid through the fourth measurement duct from the fourth pressure space to a pressure sensor outside the roll, to thereby measure the pressure of the hydraulic fluid applied to the first side bearing element and the second side bearing element.

2. The method of claim 1 wherein each bearing element has a pressure chamber, and a piston member which is received within the pressure chamber, and the pressure chamber has a surface area which acts on the piston member; and further comprising the step of calculating the force acting on a selected one of said bearing elements on the basis of the pressure of the hydraulic fluid measured by the pressure sensor positioned in communication with the measurement duct associated with said selected bearing element, and the surface area of the pressure chamber acting on the piston member of the selected bearing element.

3. The method of claim 2 wherein the deflection-compensated roll defines a nip with another roll, and forces acting on all of said bearing elements are calculated, and further comprising the step of adjusting loadings acting on the nip to a desired level based on said calculated forces acting on the bearing elements.

4. The method of claim 1, wherein the deflection-compensated roll defines a nip with a backing roll, and wherein support spots are defined on the support structure of the deflection compensated roll and the backing roll, and forces act on the support spots, and forces act on the loading devices; and further comprising the steps of:

measuring the forces acting on the support spots of the support structure of the deflection-compensated roll;

measuring the forces acting on the support spots of the backing roll;

measuring the forces acting on the loading devices of the deflection-compensated roll; and indirectly calculating the forces acting on the bearing elements on the basis of said measured forces.

5. The method of claim 4 wherein direct pressure values are determined by the sensors positioned in communication with the measurement ducts outside the roll, and further comprising the steps of:

comparing the indirectly calculated forces acting on the bearing elements with the direct pressure values; and calibrating parameters used in calculating the indirectly calculated forces so the indirectly calculated forces acting on the bearing elements correspond to the direct pressure values.

6. The method of claim 5 wherein the indirectly calculated forces acting on the bearing elements and the direct pressure values are compared as a function of time, and wherein changes relative to each other over time indicate that there is a fault or need of calibration somewhere in a valve or a sensor acting on the nip.

7. A method for determining the conditions of the rolls at a nip formed between a deflection-compensated roll and a backing roll, wherein the deflection-compensated roll has a stationary support structure and a shell rotatably mounted thereto on slide bearings including a first main bearing element operating in a first direction defined by a nip plane, and a second main bearing element operating in a direction opposite to the first direction, wherein a control valve communicates with the first main bearing element and the second main bearing element, and a first pressure space for hydraulic fluid is located between the first main bearing element and the control valve, and a second pressure space for hydraulic fluid is located between the second main bearing element and the control valve, and wherein the shell is additionally supported on the support structure with hydraulic loading devices, by which the profile of the shell in an axial direction is controllable, and wherein the slide bearings include a first side bearing element operating in a first transverse direction in a plane transverse to the nip plane and a second side bearing element operating in a direction opposite to the first transverse direction, and a second control valve is in communication with each of the first side bearing element and the second side bearing element, and wherein a third pressure space for hydraulic fluid is defined between the second control valve and the first side bearing element, and a fourth pressure space for hydraulic fluid is defined between the second control valve and the second side bearing element, and wherein a third measurement duct extends from the third pressure space to a position outside die roll, and a fourth measurement duct extends from the fourth pressure space to a position outside the roll; and wherein support spots are defined on the support structure of the deflection compensated roll and the backing roll, and forces act on the support spots, and wherein forces act on the deflection compensated roll loading devices; the method comprising the steps of:

conducting hydraulic fluid from the first pressure space through a first measurement duct to a position outside the roll;

conducting hydraulic fluid from the second pressure space through a second measurement duct to a position outside die roll;

measuring the pressure of die hydraulic fluid at the first pressure space by a pressure sensor positioned in communication with the first measurement duct outside the roll; and measuring the pressure of the hydraulic fluid at the second pressure space by a pressure sensor positioned in communication with the second measurement duct outside the roll;

conducting hydraulic fluid through the third measurement duct from the third pressure space to a pressure sensor outside the roll; and conducting hydraulic fluid through the fourth measurement duct from the fourth pressure space to a pressure sensor outside the roll, to thereby measure the pressure of the hydraulic fluid applied to the first side bearing element and the second side bearing element, wherein the pressures measured comprise direct pressure values;

measuring the forces acting on the support spots of the support structure of the deflection-compensated roll, the forces acting on the support spots of the backing roll, and the forces acting on the loading devices of the deflection-compensated roll, and calculating indirectly derived forces acting on the bearing elements on the basis of said measured forces;

comparing the indirectly derived forces and the direct pressure values, and calibrating them with respect to one another; and monitoring the change of the indirectly derived forces with respect to the direct pressure values over time to determine undesirable conditions in the rolls.

* * * * *

UNITED STATES PATENT AND TRADEMARK OFFICE
CERTIFICATE OF CORRECTION

PATENT NO. : 6,662,630 B2
DATED : December 16, 2003
INVENTOR(S) : Jori Onnela et al.

It is certified that error appears in the above-identified patent and that said Letters Patent is hereby corrected as shown below:

Column 5,
Line 24, "[(not shown in the figures)]" should be deleted

Column 6,
Line 17, "on a hydraulic" should be -- on hydraulic --

Column 8,
Line 27, "die roll" should be -- the roll --
Line 30, "die hydraulic" should be -- the hydraulic --

Signed and Sealed this

Thirteenth Day of April, 2004

JON W. DUDAS
*Acting Director of the United States Patent and Trademark Office*